US007226638B2

United States Patent
Kekkonen et al.

(10) Patent No.: US 7,226,638 B2
(45) Date of Patent: Jun. 5, 2007

(54) METHOD AND ARRANGEMENT IN CONNECTION WITH PRODUCTION LINE FOR OPTIC CABLE

(75) Inventors: Simo Kekkonen, Klaukkala (FI); Mikko Pfaffli, Masala (FI)

(73) Assignee: Nextrom Oy, Vantaa (FI)

( * ) Notice: Subject to any disclaimer, the term of this patent is extended or adjusted under 35 U.S.C. 154(b) by 587 days.

(21) Appl. No.: 10/468,347

(22) PCT Filed: Mar. 18, 2002

(86) PCT No.: PCT/FI02/00220

§ 371 (c)(1),
(2), (4) Date: Aug. 18, 2003

(87) PCT Pub. No.: WO02/075416

PCT Pub. Date: Sep. 26, 2002

(65) Prior Publication Data

US 2004/0071868 A1 Apr. 15, 2004

(30) Foreign Application Priority Data

Mar. 19, 2001 (FI) .................................. 20010551

(51) Int. Cl.
 *B05D 5/06* (2006.01)
(52) U.S. Cl. .............................. 427/162; 427/8; 427/9; 427/434.6; 427/434.2; 118/668; 118/420; 73/800; 385/100
(58) Field of Classification Search ................ 427/162, 427/8, 9, 434.6, 434.2; 118/668, 420; 385/100; 73/800
See application file for complete search history.

(56) References Cited

U.S. PATENT DOCUMENTS 1,961,368 A * 6/1934 Larson ..................... 73/862.52
4,548,085 A * 10/1985 Grundy ................. 73/862.473
5,561,730 A    10/1996 Lochkovic et al.

FOREIGN PATENT DOCUMENTS

EP      0 795 521 A1   9/1997
WO     WO 97/02503    1/1997

* cited by examiner

*Primary Examiner*—Alain L. Bashore
(74) *Attorney, Agent, or Firm*—Oliff & Berridge, PLC

(57) ABSTRACT

A method and an arrangement in connection with a production line for optic cable, wherein optical fibers (1) are guided to a coating point (3), where filling gel is applied around the fibres, and a loose tubular casing is formed around the fibres and the filling gel. The fibres (1) are guided to the coating point through a device (4) that is formed from three parts (4a, 4b, 4c), said device being supported on a first base (5) and on a second base (6) moving in the travel direction of the fibres. Sensors (7, 8) are arranged in the first and second bases (5, 6) for measuring the force acting on the bases (5, 6). The arrangement further comprises means (9) for calculating the difference between said measured values for determining the friction force between the fibres and the tubular device (4).

5 Claims, 1 Drawing Sheet

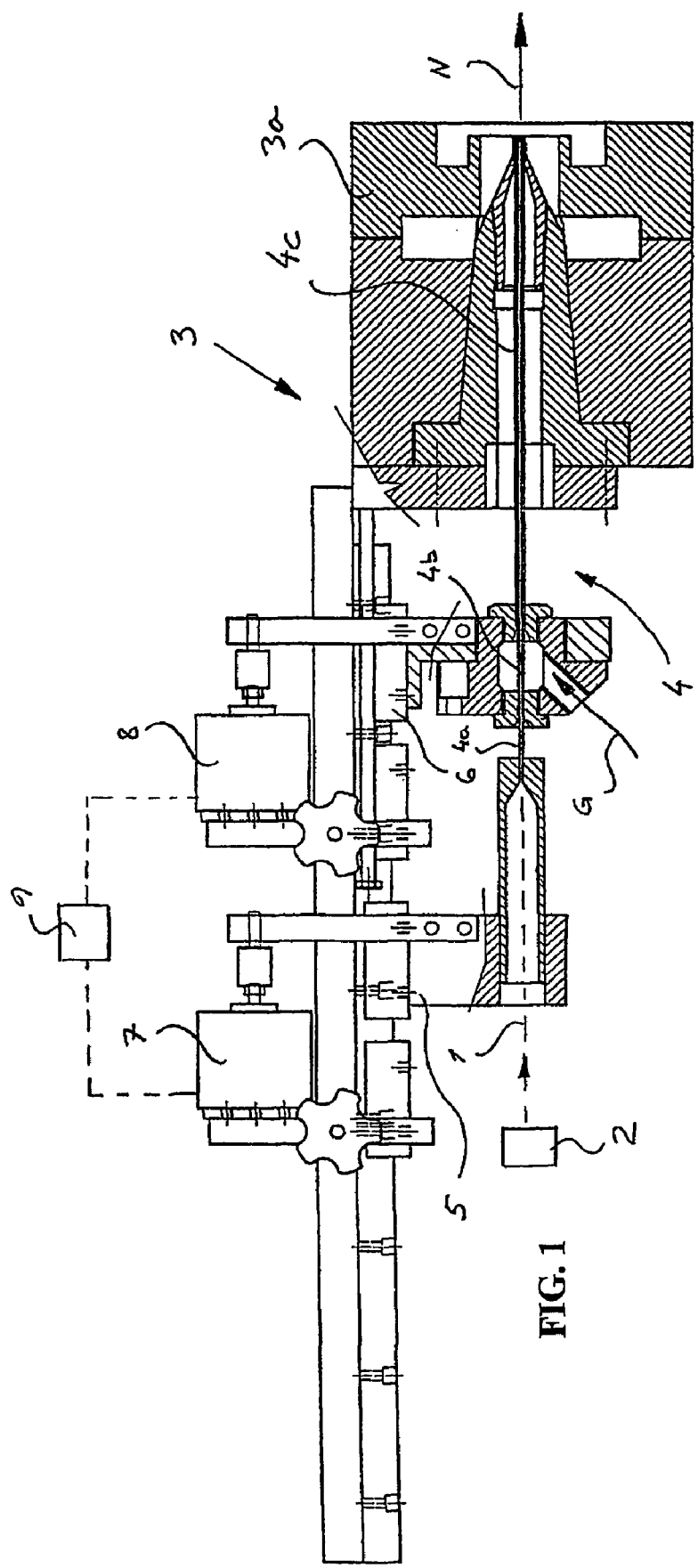
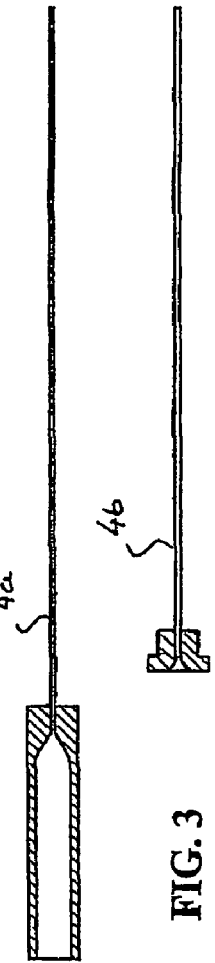
FIG. 1
FIG. 2
FIG. 3
FIG. 4

METHOD AND ARRANGEMENT IN CONNECTION WITH PRODUCTION LINE FOR OPTIC CABLE

The invention relates to a method in connection with a production line for optic cable, wherein optical fibres are guided from starting reels to a coating point, where filling gel is applied around the fibres, and a loose tubular casing is formed around the fibres and the filling gel, and in which method the fibres are guided to the coating point through a thin tubular device. The invention further relates to an arrangement in connection with a production line for optic cable.

Management of fibre tension is a known problem in secondary coating lines for optical fibres. The friction of the fibres against the devices guiding them is a significant factor that complicates the management of fibre tension.

In previously known solutions, the aim has been to minimize the friction of the fibres against the devices guiding them. However, the problem has been the inability to detect the friction. If the friction and, consequently, the fibre tension generated by the friction could be measured immediately after the last contact surface of the fibres, then this would facilitate managing the process and determining the actual stretch of the fibres. Since fibre stretch is linear, the information obtained is usable for managing the excess length in the manufacture of fibre cable.

The object of the invention is to provide a method and an arrangement for eliminating prior art drawbacks. This is achieved by the method and arrangement of the invention. The method of the invention is characterized by forming the tubular device from three parts that are at least partly arranged within each other, by supporting the front end of the tubular device guiding the fibres at the first part on a first base moving in the travel direction of the fibres, by supporting the front ends of the second and third parts of the tubular device guiding the fibres on a second base moving in the travel direction of the fibres, by measuring the force acting on the first and second bases in the travel direction of the fibres, and by subtracting the values obtained as results of said measurements from each other for determining the friction force between the fibres and the tubular device guiding the fibres. The arrangement of the invention is characterized in that the tubular device is formed from three parts that are at least partly arranged within each other, that the front end of the tubular device guiding the fibres is supported at the first part on a first base moving in the travel direction of the fibres, that the front ends of the second and third parts of the tubular device guiding the fibres are supported on a second base moving in the travel direction of the fibres, that sensors are arranged in the first and the second base for measuring the force acting on the bases in the travel direction of the fibres, and that the arrangement further comprises means for calculating the difference between said measured values for determining the friction force between the fibres and the tubular device guiding the fibres.

The most important advantage of the invention is the ability to measure the friction, and, simultaneously, fibre tension, that was previously considered impossible, immediately after the last contact surface of the fibres. Due to the linear stretch of the fibres, the measurement information obtained can be utilized as an essential factor in the manufacture of fibre cable in the management of the excess length of the fibres. A further advantage of the invention is its simplicity, making it inexpensive to take into use and to use.

In the following, the invention will be described in detail by means of a preferred exemplary embodiment in the accompanying drawing, in which FIG. 1 is a schematic cross sectional side view of the arrangement of the invention, FIGS. 2 to 4 are side views of the essential parts of the arrangement of FIG. 1.

FIG. 1 is a schematic cross sectional side view of the arrangement of the invention. In FIG. 1, optical fibres are denoted by reference 1. The fibres 1 are guided from input coils 2 to a coating point 3, where filling gel is applied around the fibres and a loose tubular casing is formed around the fibres and the filling gel. The figure schematically shows the optical fibres 1 by means of a dashed line. In the figure, an arrow denotes the travel direction of the fibres. FIG. 1 also schematically shows the input coils. The fibres 1 are guided to the coating point 3 through a thin tubular device 4. The tubular casing is formed by means of an extrusion head 3a, schematically shown in FIG. 1. The assembly comprising the fibres, the gel and the casing is guided forward as shown by arrow N in the figure.

The above is prior art known to a person skilled in the art, and there is therefore no need for a more detailed description thereof herein. In this connection, reference is made to e.g. Finnish patent 105599, which discloses the above prior art in detail.

In accordance with an essential idea of the invention, the front end of the tubular device 4 guiding the fibres 1 is supported on a first base 5 moving in the travel direction of the fibres. The tubular device 4 is also supported at a second point on a second base 6 moving in the travel direction of the fibres. The tubular device 4 is formed from three parts 4a, 4b, 4c that are at least partly arranged within each other, the tubular part being supported on the first base at part 4a and on the second base at the front ends of parts 4b and 4c. As the figure shows, the bases 5, 6 can be arranged to rest on a rail-like structure, for example. As the fibres 1 move through the tubular device 4 in the above-described manner, they generate a force due to friction, and the force is transmitted to the bases 5, 6. In different process steps, e.g. the feed of gel, the bases 5, 6 are also subjected to other forces. Said forces are measured by sensors 7, 8 arranged in connection with the first and second bases 5, 6. The sensors are arranged to measure the force that is directed to the bases and generated by the fibres and acting in the travel direction of the fibres, and the force that is generated during the feed of gel. The values obtained as results of the measurements are subtracted from each other for determining the friction force between the fibres 1 and the tubular device 4 guiding the fibres. The difference between the measured values is obtained by means of a suitable calculation means 9. The calculation means can be any suitable calculator. FIG. 1 schematically shows the calculation means 9. The above result provides essentially important information that is usable in the manufacture of fibre cable for the management of the excess length of the fibres.

In the exemplary embodiment of FIG. 1, the tubular device 4 for guiding the fibres is formed from several elements, as was stated above. FIGS. 2 to 4 are separate views of the elements or parts from which the tubular device for guiding the fibres is formed. FIG. 2 shows a part 4a for guiding the fibres, also called a fibre needle. FIG. 3 shows a compact guiding extension 4b for the fibre needle. FIG. 4 shows a guiding part 4c for filling gel, also called a jelly needle. Said parts are arranged partly within each other as FIG. 1 shows, the part 4a for guiding the fibres being within the guiding extension 4b, and the part formed by said elements being within the guiding part 4c for filling gel. Filling gel is fed between the guiding part 4c and the guiding extension as shown by arrow G in FIG. 1.

As the fibres 1 travel through the part 4a for guiding the fibre, the friction between the fibres and the part 4a guiding the fibres generates a force that is transmitted to base 5. This force is measured with a sensor 7, to which power is transferred in the manner shown in FIG. 1. Such measurement arrangements are known to a person skilled in the art, and therefore no details need be given in this context. FIG. 1 further shows that the feed of gel generates a separate force via the guiding part 4c, and the effect of this force is taken into account by measuring the force directed to base 6 with a sensor 8. The measurement means may be the same as was described in connection with base 5. By subtracting said measured values from each other, a measured value is obtained that depicts the force generated to the fibres from the friction between the tubular device 4 guiding the fibres and the fibres. This measured value is usable in the manufacture of cable, as was stated above.

The force created by the friction between the fibres 1 and the tubular device 4 guiding the fibres can be adjusted for instance by adjusting the length of the tubular device 4. The length of the tubular device 4 can be made adjustable for instance by changing the distance between the first and second bases 5, 6 such that the rear end of the part 4a for guiding the fibres is arranged to move relative to the second base, i.e. by forming a kind of telescopic structure, whereby the part 4a for guiding the fibres moves relative to the guiding extension 4b. The idea is that when the length of the structure formed by the part 4a for guiding the fibres and the guiding extension 4b increases, the surface creating the friction also increases generating a higher friction force and vice versa.

The inner diameter of the tubular device 4 can also be made adjustable. Adjustability is obtained for instance by changing elements.

The above exemplary embodiment is in no way intended to restrict the invention, but the invention can be modified freely within the scope of the claims. It is therefore apparent that the arrangement of the invention or its details do not have to be similar to those shown in the figures, but other details are also feasible. In the example of the figures, the sensors are arranged such that the force is transferred via a lever element to the sensor. However, this is not the only embodiment, but the measurement may also be effected by arranging the measurement elements, e.g. strain gauges, such that the measurement is made for instance directly from between the part guiding the fibres and the base etc.

The invention claimed is:

1. A method of forming an optic cable comprising:
   forming a thin tubular device from a first part, a second part, and a third part that are at least partly arranged within each other;
   supporting a front end of the first part of the thin tubular device on a first base;
   guiding the optical fibres by moving the first base in the travel direction of the optical fibres;
   supporting a front end of a second part and a front end of a third part of the thin tubular device on a second base;
   guiding the optical fibres by moving the second base in the travel direction of the optical fibres;
   measuring the force acting on the first base and the second base in the travel direction of the optical fibres; and
   subtracting the force acting on the first base from the force acting on the second base to determine the friction force between the optical fibres and the thin tubular device guiding the optical fibres.

2. A production line for an optic cable, wherein the optic cable is formed by guiding optical fibres from a starting reel to a coating point, the coating point comprising feed means for feeding a filling gel around the optical fibres, and extrusion means for forming a loose tubular casing around the optical fibres and the filling gel, the production line comprising:
   a tubular device having a first part, a second part, and a third part that are at least partly arranged within each other;
   a first base that supports the first part of the tubular device;
   a second base that supports a front end of the second part and a front end of the third part;
   a first sensor arranged on the first base for measuring a force acting on the first base;
   a second sensor arranged on the second base for measuring a force acting on the second base; and
   means for calculating the difference between the force acting on the first base and the force acting on the second base to determine the friction force between the optical fibres and the tubular device that guides the optical fibres.

3. A production line for an optic cable according to claim 2, wherein the length of the tubular device that guides the optical fibres is adjustable.

4. A production line for an optic cable according to claim 2, wherein the inner diameter of the tubular device that guides the optic fibres is adjustable.

5. A production line for an optic cable according to claim 3, wherein the length of the tubular device that guides the optic fibres can be adjusted by changing the distance between the first and the second base such that a rear end of a part guiding the optic fibres moves relative to the second base.

* * * * *